US010259259B2

United States Patent
Nakagawa (10) Patent No.: US 10,259,259 B2
(45) Date of Patent: Apr. 16, 2019

(54) ASSEMBLED STRUCTURE FOR TIRE WHEEL, BRAKE ROTOR, AND HUB

(71) Applicant: TOYOTA JIDOSHA KABUSHIKI KAISHA, Toyota-shi, Aichi-ken (JP)

(72) Inventor: Kenji Nakagawa, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/808,270

(22) Filed: Nov. 9, 2017

(65) Prior Publication Data
US 2018/0222250 A1 Aug. 9, 2018

(30) Foreign Application Priority Data
Feb. 7, 2017 (JP) ................... 2017-019995

(51) Int. Cl.
| | |
|---|---|
| *B60B 3/16* | (2006.01) |
| *B60B 27/00* | (2006.01) |
| *F16D 65/12* | (2006.01) |
| *F16D 65/02* | (2006.01) |

(52) U.S. Cl.
CPC ........... *B60B 3/16* (2013.01); *B60B 27/0052* (2013.01); *F16D 65/123* (2013.01); *B60B 2900/325* (2013.01); *B60B 2900/3312* (2013.01); *B60B 2900/3314* (2013.01); *B60Y 2200/11* (2013.01); *F16D 2065/136* (2013.01); *F16D 2065/138* (2013.01); *F16D 2065/1348* (2013.01); *F16D 2065/1384* (2013.01); *F16D 2065/1392* (2013.01); *F16D 2065/1396* (2013.01)

(58) Field of Classification Search
CPC .................. B60B 3/16; B60B 27/0052; B60B 2900/3314; B60B 2900/3312; B60B 2900/325; F16D 65/123; F16D 2065/1384; F16D 2065/138; F16D 2065/1348; F16D 2065/1392; F16D 2065/1396; B60Y 2200/11
USPC ........................................... 301/6.1, 6.6, 6.8
See application file for complete search history.

(56) References Cited

U.S. PATENT DOCUMENTS

| | | | |
|---|---|---|---|
| 8,074,773 B2 * | 12/2011 | Brittingham ............ | B60B 27/00 188/18 A |
| 8,646,850 B2 * | 2/2014 | Moore .................. | B60B 21/062 188/71.1 |

(Continued)

FOREIGN PATENT DOCUMENTS

JP 2014-218151 A 11/2014

*Primary Examiner* — S. Joseph Morano
*Assistant Examiner* — Jean W Charleston
(74) *Attorney, Agent, or Firm* — Sughrue Mion, PLLC (57) ABSTRACT

Mechanical strength of a second shaft portion of a position fixing bolt is larger than that of a first shaft portion of a positioning bolt. Cross-sectional shape of a positioning through-hole, cross-sectional shape of the first shaft portion, cross-sectional shape of each of position fixing through-holes, and cross-sectional shape of each of the second shaft portions are designed so that a total dimension of a first clearance in a circumferential direction about the rotation center axis is larger than a total dimension of a second clearance in the circumferential direction, the second clearance formed between an inner peripheral surface of each of the position fixing through-holes and an outer peripheral surface of the second shaft portion of each of the position fixing bolts.

4 Claims, 8 Drawing Sheets

(56) References Cited

U.S. PATENT DOCUMENTS

| | | | | |
|---|---|---|---|---|
| 2002/0139622 A1* | 10/2002 | Chen | ................... | F16D 65/123 188/218 XL |
| 2003/0117007 A1* | 6/2003 | Williams | ................ | F16D 65/12 301/6.8 |
| 2007/0102246 A1* | 5/2007 | Carroll | ................... | F16D 65/12 188/17 |
| 2007/0125606 A1* | 6/2007 | Chen | ................... | B62K 19/38 188/24.19 |

* cited by examiner

ASSEMBLED STRUCTURE FOR TIRE WHEEL, BRAKE ROTOR, AND HUB

BACKGROUND OF THE INVENTION

1. Field of the Invention

The present invention relates to an assembled structure for assembling a tire wheel, a brake rotor and a hub, which are provided in a vehicle, with each other.

2. Description of the Related Art

In the following description of this specification, one side in a direction along the rotation center axis of each wheel is referred to as "vehicle external side (vehicle outside)" and the other side in the direction along the rotation center axis is referred to as "vehicle internal side (vehicle inside)". More specifically, as to right wheels, the right side in the direction along the rotation center axis is referred to as the "vehicle external side" and the left side in the direction along the rotation center axis is referred to as the "vehicle internal side". Similarly, as to left wheels, the left side in the direction along the rotation center axis is referred to as the "vehicle external side" and the right side in the direction along the rotation axis is referred to as the "vehicle internal side".

Japanese Unexamined Patent Application Publication No. 2014-218151 discloses an assembled structure for assembling a tire wheel, a brake rotor (a brake disc) and a hub with each other in a vehicle.

A plurality of position fixing threaded holes and one positioning threaded hole are formed in the hub, all of which extend in a direction parallel to the rotation center axis of the hub. Each position fixing threaded hole is aligned on a circumference about the rotation center axis of the hub. Furthermore, a projecting portion, which has an annular shape and is coaxial with the rotation center axis, is provided on the center portion of the vehicle external side surface of the hub.

The brake rotor, which generates a braking force when a brake pad is pressed thereto, is arranged on vehicle external side of the hub. In addition, position fixing through-holes having the same number as the position fixing threaded holes and one positioning through-hole are formed in the brake rotor. Both the position fixing through-holes and the positioning through-hole extend in a direction parallel to the rotation center axis. Each position fixing through-hole is aligned on the circumference when viewed in the rotation center axis direction of the brake rotor. Furthermore, each position fixing through-hole has a diameter larger than that of each position fixing threaded hole. Similarly, the positioning through-hole has a diameter larger than that of the positioning threaded hole.

Furthermore, a circular recess, which the projecting portion of the hub is rotatably fitted into and is coaxial with the rotation center axis of the brake rotor, is formed on the center portion of a vehicle internal side surface of the brake rotor. Therefore, the hub and the brake rotor can rotate with respect to each other about the rotation center axis (the above-mentioned recess and projecting portion) when they are not fixed to each other by a positioning bolt and position fixing bolts described later.

In addition, a projecting portion having an annular shape is provided on the center portion of a vehicle external side surface of the brake rotor.

The brake rotor and the hub are temporarily fixed to each other by the positioning bolt.

The positioning bolt is integrally provided with a first head portion and a first shaft portion having smaller diameter than the first head portion. A first screw portion is formed in part of this first shaft portion.

The inner diameter of the positioning through-hole of the brake rotor is larger than the outer diameter of the first shaft portion of the positioning bolt. Therefore, the first shaft portion of the positioning bolt can be inserted into and removed from the positioning through-hole. Then, when the first shaft portion is inserted into the positioning through-hole, a clearance is formed between the positioning through-hole and the first shaft portion of the positioning bolt. Hereinafter, this clearance is referred to as a first clearance.

To temporarily fix the brake rotor and the hub to each other, firstly the first shaft portion of the positioning bolt is inserted into the positioning through-hole of the brake rotor from the vehicle external side and the first screw portion of the positioning bolt is temporarily tightened in the positioning threaded hole.

Subsequently, the relative rotational position of the brake rotor with respect to the hub in the circumferential direction about the rotation center axis is finely adjusted using the first clearance, so that each position fixing through-hole and each position fixing threaded hole are substantially coaxial with each other. That is, each of the position fixing threaded holes is positioned on the inner peripheral side of the corresponding one of the position fixing through-holes when viewed in the rotation center axis direction.

Then, the first screw portion is screwed into the positioning threaded hole of the hub so that the first head portion of the positioning bolt contacts with the vehicle external side surface of the brake rotor with the vehicle internal side surface of the brake rotor in contact with the vehicle external side surface of the hub. Then, the hub and the brake rotor are temporarily fixed to each other by the positioning bolt.

The tire wheel is attached to the hub and the brake rotor, which have been temporarily fixed to each other in this way.

The tire wheel, to which the tire is detachable, is located on the vehicle external side of the brake rotor. Further, wheel through holes, which extend in a direction parallel to the rotation center axis of the tire wheel and have the same number as the position fixing threaded holes, are formed in the tire wheel. Each wheel through-hole is aligned on the circumference when viewed in the rotation center axis direction.

Furthermore, a recess, which the projecting portion of the brake rotor is rotatably fitted into and has a circular shape, is formed in the center portion of the vehicle internal side surface of the tire wheel. Thus, the tire wheel and the brake rotor are relatively rotatable with each other about the rotation center axis (the recess and the projecting portion).

The tire wheel, which is rotatably supported by the brake rotor, is fixed to the hub and the brake rotor using position fixing bolts having the same number as the wheel through holes.

Each of the position fixing bolts is integrally provided with a second head portion and a second shaft portion having a diameter smaller than that of the second head portion. A second thread portion is formed on part of the second shaft portion.

The inner diameter of the position fixing through-hole of the brake rotor is larger than the outer diameter of the second shaft portion of the position fixing bolt. Therefore, the second shaft portion of each position fixing bolt can be inserted into and removed from each position fixing through-hole. Then, when the second shaft portion of each position fixing bolt is inserted into the corresponding one of the position fixing through-holes, a clearance is formed between each position fixing through-hole and each second shaft portion. Hereinafter, this clearance is referred to as a second clearance.

To fix the tire wheel to the hub and the brake rotor, firstly the position of each wheel through hole of the tire wheel in the circumferential direction is made to be coincide with that of each position fixing through-hole of the brake rotor by relatively rotating the tire wheel with respect to the brake rotor. Further, the tire wheel is brought into contact with the brake rotor from the vehicle external side.

Further, with this state maintained, the second shaft portion of each position fixing bolt is inserted into each wheel through hole and each position fixing through-hole from the vehicle external side, and the second threaded portion is screwed into each position fixing threaded hole so that the second head is brought into contact with the vehicle external side surface of the tire wheel.

Then, the tire wheel is fixed to the hub and the brake rotor.

SUMMARY OF THE INVENTION

As described above, the first clearance is used for finely adjusting (finely tuning) the rotational position of the brake rotor with respect to the hub so that each of the position fixing threaded holes is positioned on the inner peripheral side of the corresponding one of the position fixing through-holes when viewed in the rotation center axis direction.

That is, when the brake rotor is relatively rotated to the hub about the recess and the projecting portion within a range where the positioning through-hole and the first shaft portion of the positioning bolt do not contact with each other under the state where the first screw portion of the positioning bolt is temporarily tightened in the positioning threaded hole, each of the position fixing threaded holes is positioned on the inner peripheral side of the corresponding one of the position fixing through-holes when viewed in the rotation center axis direction.

Therefore, when the total value of the circumferential dimension of the first clearance is larger than the total value of the circumferential dimension of the second clearance, a problem may occur. Namely, in this case, when the whole circumferential area of the first clearance is used to rotate the brake rotor with respect to the hub, part of the position fixing threaded hole is located on the outer peripheral side of the corresponding position fixing through-hole when viewed in the rotation center axis direction. Therefore, in this case, the second threaded portion of the position fixing bolt cannot be screwed into the position fixing threaded hole of the hub.

Thus, when the total value of the circumferential dimension of the first clearance is larger than the total value of the circumferential dimension of the second clearance, it is not easy to finely adjust the relative rotational position of the brake rotor with respect to the hub so that each of the position fixing threaded holes is located on the inner peripheral side of the corresponding one of the position fixing through-holes when viewed in the rotation center axis direction.

Therefore, cross-sectional shapes of the positioning through-hole, the first shaft portion (the position fixing threaded hole) of the positioning bolt, the position fixing through-holes, and the second shaft portions of the position fixing bolts (the position fixing threaded holes) are designed so that the total value of the circumferential dimension of the first clearance is smaller than the total value of the circumferential dimension of the second clearance.

By the way, if the axial force of the position fixing bolt decreases under the state where the vehicle equipped with the tire wheel, the brake rotor and the hub is running, the brake rotor rotates with respect to the hub about the rotation center axis due to the rotational force which the brake rotor receives from the tire.

As described above, the total value of the circumferential dimension of the first clearance is smaller than the total value of the circumferential dimension of the second clearance. Therefore, the inner peripheral surface of the positioning through-hole of the brake rotor collides with the first shaft portion of the positioning bolt.

However, the positioning bolt is a bolt for positioning and temporarily fixing the hub and the brake rotor. In other words, the hub and the brake rotor (and the tire wheel) are fixed to each other by the position fixing bolts.

Thus, the positioning bolt is typically designed so that the mechanical strength of the first shaft portion is smaller than the mechanical strength of the second shaft portion of the position fixing bolt.

Therefore, it is not preferable that the inner peripheral surface of the positioning through-hole of the brake rotor collides with the first shaft portion of the positioning bolt.

In other words, when the brake rotor rotates with respect to the hub due to the reduction of the axial force of the position fixing bolt, it is preferable that the rotational force of the brake rotor is received by the second shaft portion of the position fixing bolt instead of the first shaft portion of the positioning bolt.

The present invention has been made to cope with the above problems, and has an object to provide an assembled structure for a tire wheel, a brake rotor and a hub in which relative position of the brake rotor to the hub can be easily adjusted so that each of position fixing threaded holes is located on inner peripheral side of each of position fixing through-holes when viewed in a direction of arrangement of the tire wheel, the brake rotor and the hub, and rotational force of the brake rotor can be received by a shaft portion of a position fixing bolt when the brake rotor rotates with respect to the hub due to the reduction of an axial force of the position fixing bolt.

In order to achieve the object, an assembled structure for tire wheel, brake rotor, and hub comprises:

a hub (20, 21, 25) including at least one positioning threaded hole (29) and a plurality of position fixing threaded holes (28), the hub supported by a vehicle body so as to be rotatable about a predetermined rotation center axis (CA);

a brake rotor (30) that faces the hub from one side of the rotation center axis and is rotatable with respect to the hub about the rotation center axis, the brake rotor including at least one positioning through-hole (35) and a plurality of position fixing through-holes (33);

a tire wheel (40) facing the brake rotor from the one side and being rotatable with respect to the brake rotor about the rotation center axis, the tire wheel including a plurality of wheel through-holes (43);

at least one positioning bolt (50) including a first head portion (51) that contacts with a surface of the brake rotor from the one side and a first shaft portion (52, 53) that passes through at least one the positioning through-hole from the one side to the other side of the rotation center axis and has a first screw portion (54) screwed into at least one the positioning threaded hole;

a plurality of position fixing bolts (60) each of which includes a second head portion (61, 61b) contacting with a surface of the tire wheel from the one side and a second shaft portion (63, 64) passing through each of the wheel through-holes and each of the position fixing through-holes from the one side to the other side, the second shaft portion having a second screw portion (65) that fixes the tire wheel to the hub and the brake rotor by being screwed into each of the position fixing threaded holes; and at least one shock absorber (55, 70) that is installed in a first clearance (CL1) formed between an inner peripheral surface of the positioning through-hole and an outer peripheral surface of the first shaft portion of the positioning bolt, the shock absorber contacting with the inner peripheral surface and the outer peripheral surface while elastically deforming.

Further, mechanical strength of the second shaft portion of the position fixing bolt is larger than that of the first shaft portion of the positioning bolt.

Further, cross-sectional shape of the positioning through-hole, cross-sectional shape of the first shaft portion, cross-sectional shape of each of the position fixing through-holes, and cross-sectional shape of each of the second shaft portions are designed so that a total dimension of the first clearance in a circumferential direction (SC) about the rotation center axis is larger than a total dimension of a second clearance (CL2) in the circumferential direction. The second clearance is formed between an inner peripheral surface of each of the position fixing through-holes and an outer peripheral surface of the second shaft portion of each of the position fixing bolts.

In the present invention, the total value of the dimension of the first clearance, which is formed between the inner peripheral surface of the positioning through-hole and the outer peripheral surface of the first shaft portion of the positioning bolt, in the circumferential direction centered on the rotation center axis is larger than the total value of the dimension of the second clearance, which is formed between the inner peripheral surface of each of the position fixing through-holes and the outer peripheral surface of the second shaft portion of each of the position fixing bolts, in the circumferential direction.

However, the shock absorber is installed in the first clearance. The shock absorber contacts with the inner peripheral surface of the positioning through-hole and the outer peripheral surface of the first shaft portion of the positioning bolt while elastically deforming.

Therefore, although the total value of the dimension of the first clearance in the circumferential direction is larger than the total value of the dimension of the second clearance in the circumferential direction, it is easy to finely adjust the relative rotational position of the brake rotor with respect to the hub when the first screw portion of the positioning bolt is temporarily tightened in the positioning threaded hole. That is, it is easy to finely adjust the relative rotational position of the brake rotor with respect to the hub so that each of the position fixing threaded holes is located on the inner peripheral side of the corresponding one of the position fixing through-holes when viewed in the direction of arrangement of the tire wheel, the brake rotor, and the hub by using the elasticity of the shock absorber and the first clearance.

Therefore, it is easy to fix the tire wheel to the hub and the brake rotor by the position fixing bolts.

Further, in the present invention, since the shock absorber is installed in the first clearance, the inner peripheral surface of the positioning through-hole does not collide with the first shaft portion of the positioning bolt when the brake rotor rotates with respect to the hub due to the reduction of the axial force of the position fixing bolts. That is, when the brake rotor rotates with respect to the hub, the inner peripheral surface of the position fixing through-hole collides with the outer peripheral surface of the second shaft portion of the position fixing bolt. In other words, the rotational force of the brake rotor is received by the second shaft of the position fixing bolt, which is higher in mechanical strength than the first shaft portion, instead of the first shaft portion of the positioning bolt.

Although the positioning through-hole moves with respect to the positioning bolt when the brake rotor rotates with respect to the hub, most of moving force of the positioning through-hole is absorbed by the shock absorber. As a result, most of the moving force of the positioning through-hole is not transmitted to the first shaft portion of the positioning bolt.

In one aspect of the present invention, cross-sectional shapes of the positioning through-hole, the first shaft portion, the position fixing through-hole, and the second shaft portion are circular shapes, a difference between an inner diameter of the positioning through-hole and an outer diameter of the first shaft portion is larger than an inner diameter of the position fixing through-hole and an outer diameter of the second shaft portion.

In one aspect of the present invention, the shock absorber is an O-ring (55) made of rubber.

According to the one aspect of the present invention, the shock absorber can be made at low cost.

In one aspect of the present invention, the shock absorber is a metal annular member (70) which can elastically deform in a radial direction thereof.

According to the one aspect of the present invention, the shock absorber can be made at low cost.

In the above description, references used in the following descriptions regarding embodiments are added with parentheses to the elements of the present invention, in order to understand the invention. However, those references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

Hereinafter, an assembled structure of a hub 20, a brake rotor 30 and a tire wheel 40 according to an embodiment of the present invention will be described with reference to FIG. 1 to FIG. 6.

A wheel 10 comprises the hub 20, the brake rotor 30 and the tire wheel 40.

The hub 20 is made of metal. As shown in FIGS. 1, 4, 5 and 6, the hub 20 comprises a hub body 21 and a flange portion 25.

The hub 20 is supported by a vehicle body (not shown) via a suspension member (for example, a hub carrier) (not shown).

When the wheel 10 is an undriven wheel, the hub 20 (the hub body 21) is supported by the hub carrier via a spindle which is the rotation center axis CA (see FIG. 1) extending horizontally. In this case, the hub 20 can rotate around the spindle with respect to the hub carrier.

On the other hand, when the wheel 10 is a driven wheel, the hub 20 (the hub body 21) is fixed to an end of the drive shaft which is the rotation center axis CA penetrating through the hub carrier and extending horizontally.

Figure 4:
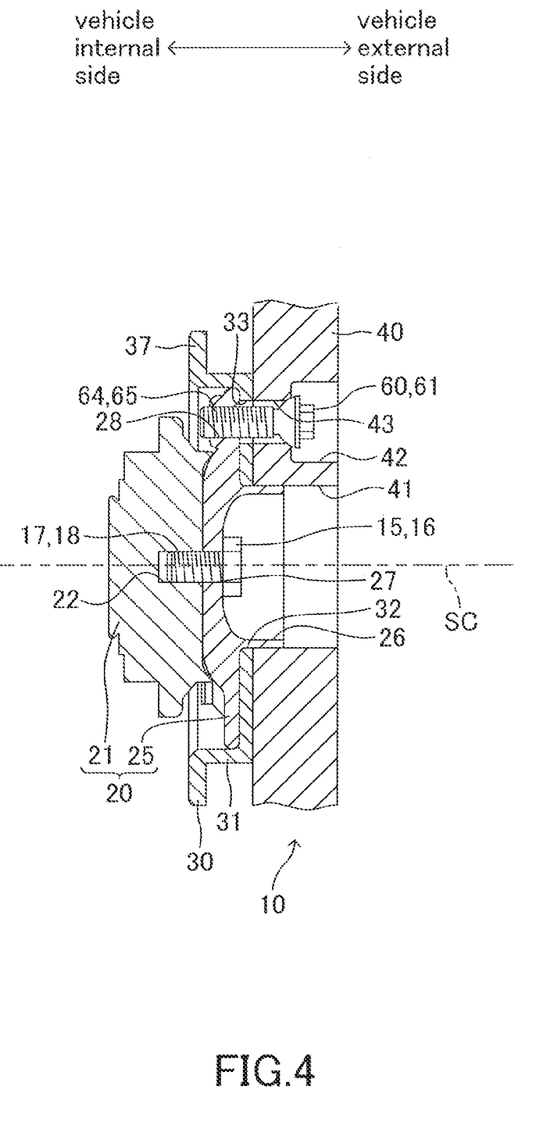
FIG. 4 is a cross-sectional view of the tire wheel, the brake rotor, and the hub taken along line IV-IV of FIG. 2.

The hub body 21 is a substantially columnar member centered on the rotation center axis CA. As shown in FIG. 4, one threaded hole 22 coaxial with the rotation center axis CA is formed on the vehicle external side surface of the hub body 21.

Figure 1:
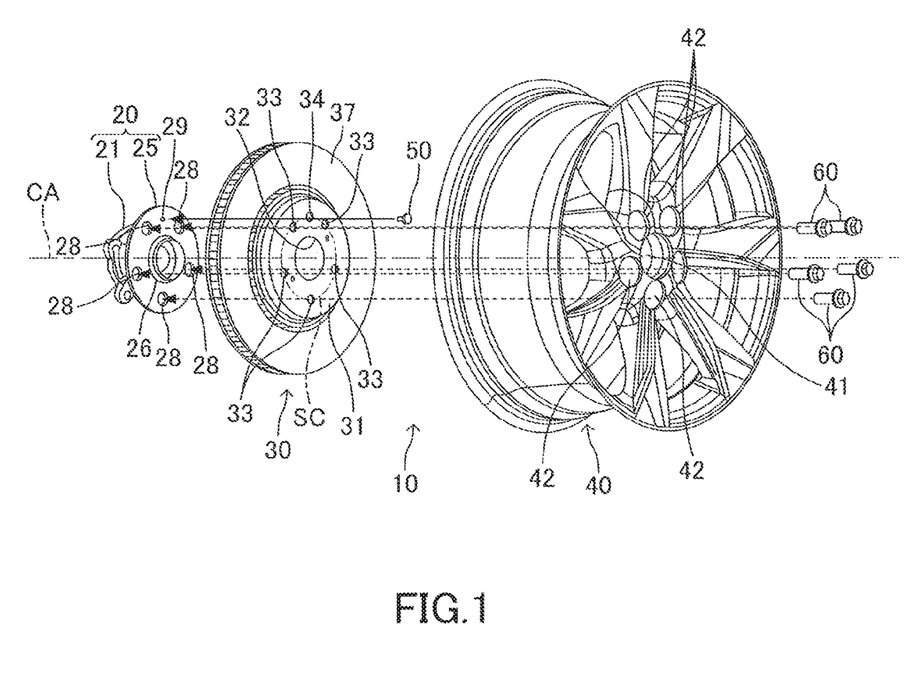
FIG. 1 is an exploded perspective view of a tire wheel, a brake rotor, a hub, a positioning bolt and position fixing bolts according to an embodiment of the present invention.

The flange portion 25 is a substantially disc-like member centered on the rotation center axis CA. As shown in FIG. 1 and FIG. 4, a first projecting portion 26 which has a cylindrical shape centered on the rotation center axis CA is provided at the center portion of the vehicle external side surface of the flange portion 25. Furthermore, one through-hole 27, which is located on the inner peripheral side of the first projecting portion 26 and is coaxial with the rotation center axis CA, is formed in the flange portion 25.

Furthermore, as shown in FIGS. 1, 4, 5, and 6, five position fixing threaded holes 28, which are located on the outer peripheral side of the first projecting portion 26 and are positioned on one circumference centered on the rotation center axis CA, are formed in the flange portion 25 at equal angular intervals.

Furthermore, one positioning threaded hole 29 located on the outer peripheral side of the first projecting portion 26 is formed in the flange portion 25. The positioning threaded hole 29 is also positioned on the above circumference on which the position fixing threaded holes 28 are positioned. The inner diameter of the positioning threaded hole 29 is smaller than the inner diameter of each of the position fixing threaded holes 28.

As shown in FIG. 4, the vehicle external side surface of the hub body 21 and the vehicle internal side surface of the flange portion 25 are in contact with each other so that relative rotation therebetween is prohibited. Furthermore a hub fixing bolt 15 is inserted into the through-hole 27 of the flange portion 25 from the vehicle external side. The head portion 16 of the hub fixing bolt 15 is in contact with the vehicle external side surface of the flange portion 25 and the screw portion 18 formed on the shaft portion 17 of the hub fixing bolt 15 is screwed into the threaded hole 22.

Accordingly, the hub body 21 and the flange portion 25 are fixed to each other so that relative rotation therebetween is prohibited.

The brake rotor 30 is made of metal. As shown in FIGS. 1, 4, 5 and 6, the brake rotor 30 is located on the vehicle external side of the hub 20.

The brake rotor 30 is a substantially disc-like member centered on the rotation center axis CA. The outer diameter of the brake rotor 30 is larger than the outer diameter of the flange portion 25.

A second projecting portion 31, which is an annular projecting portion coaxial with the rotation center axis CA, is formed at the center portion of the vehicle external side surface of the brake rotor 30.

As shown in FIGS. 1 and 4, one first rotation support hole 32, which is coaxial with the rotation center axis CA and penetrates through the brake rotor 30 (the second projecting portion 31), is formed in the center portion of the brake rotor 30. The inner diameter of the first rotation support hole 32 is substantially the same as the outer diameter of the first projecting portion 26 of the hub 20.

Five position fixing through-holes 33, each of which penetrates through the brake rotor 30 in a direction parallel to the rotation center axis CA and has circular shape in cross-section, are formed in the center portion of the brake rotor 30 (i.e., a portion in which the second projecting portion 31 is formed). As shown in FIG. 1, each of the position fixing through-holes 33 is formed on one base circumference SC, which is centered on the rotation center axis CA and has the same diameter as the circumference (on which each of the position fixing threaded holes 28 is positioned) at equal angular intervals. Each of the position fixing through-holes 33 is larger than each of the position fixing threaded holes 28.

Figure 5:
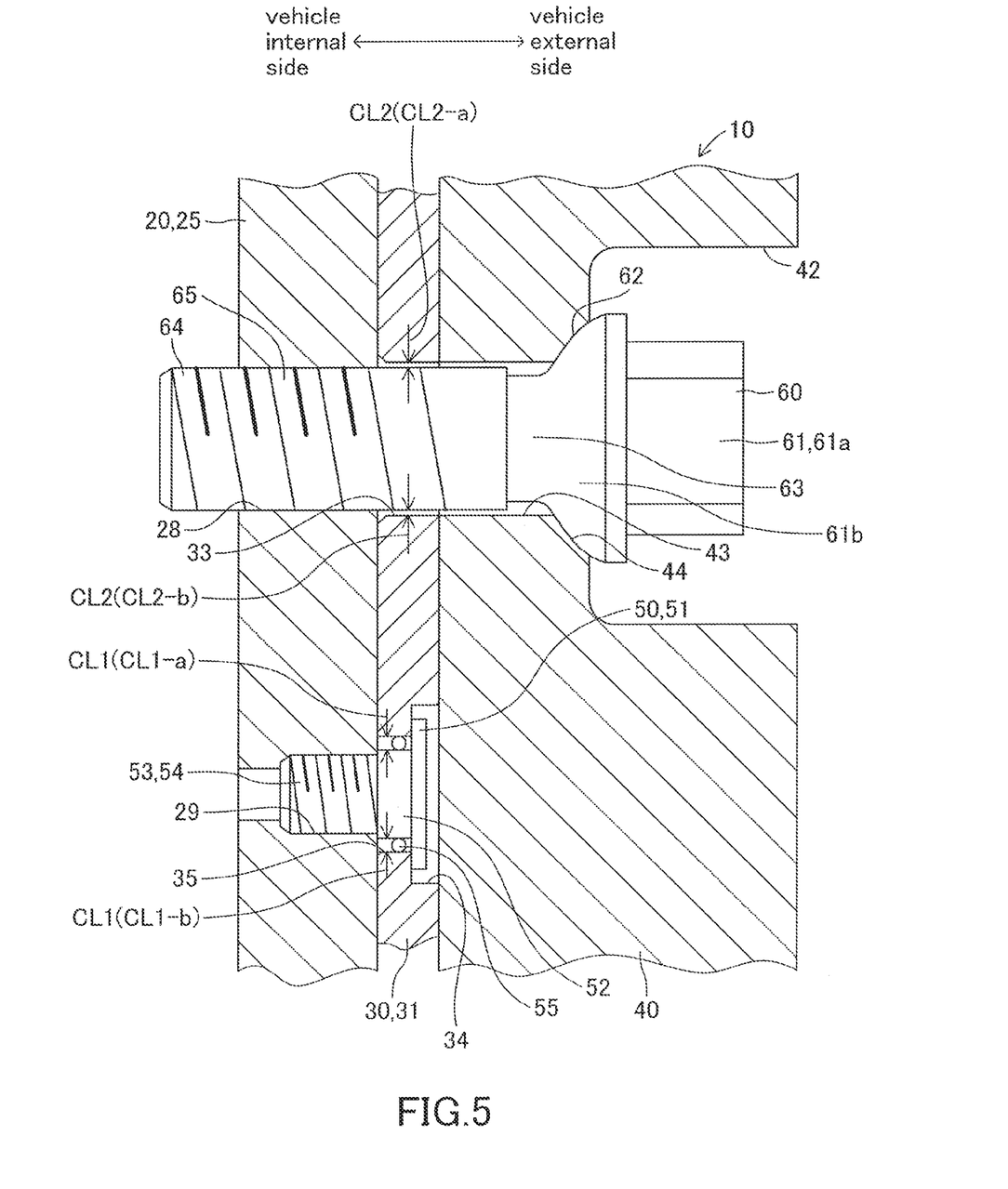
FIG. 5 is a cross-sectional view of the tire wheel, the brake rotor and the hub taken along a base circumference.
Figure 6:
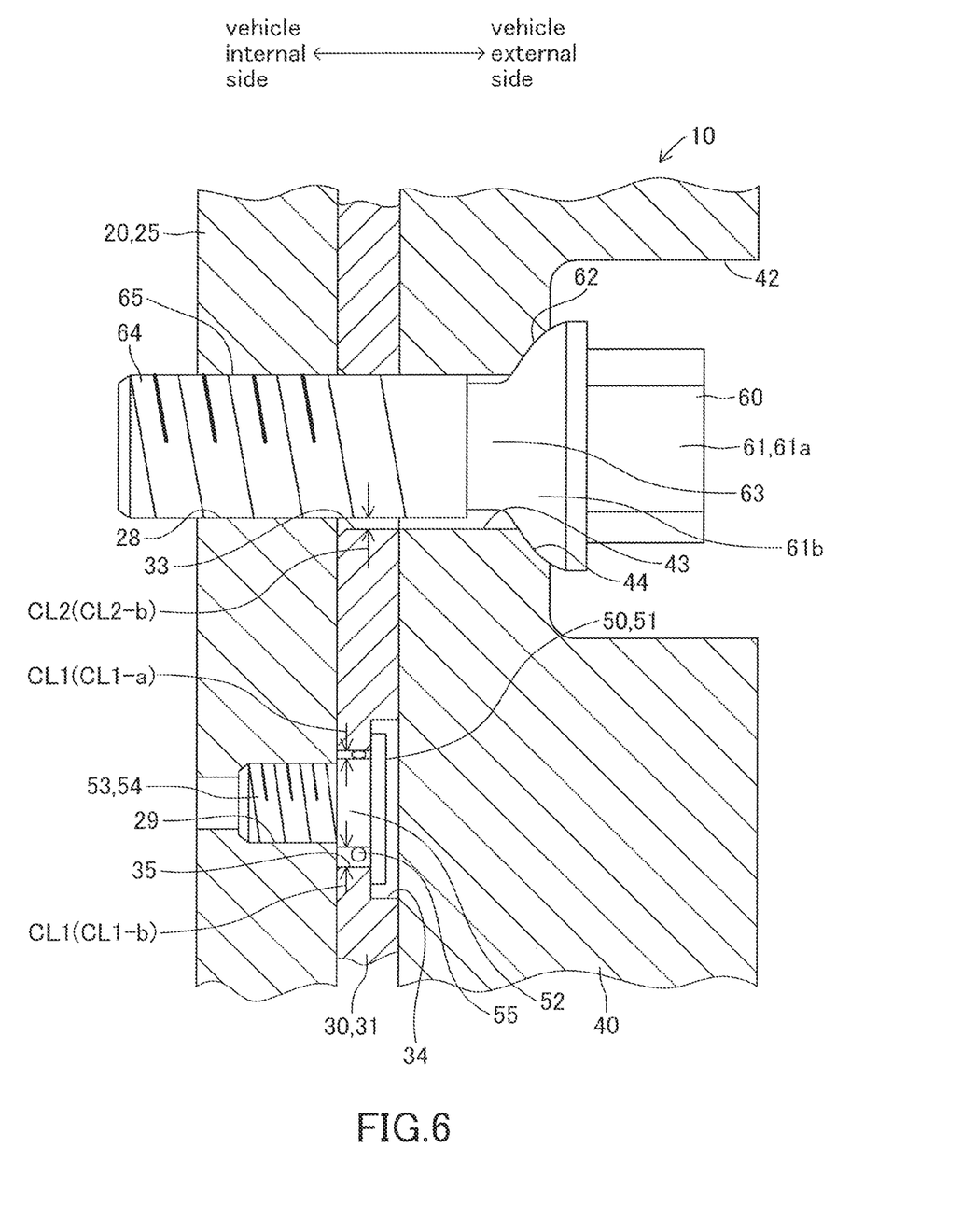
FIG. 6 is a cross-sectional view similar to FIG. 5 when the brake rotor rotates with respect to the hub.

As shown in FIGS. 1, 5 and 6, one head receiving recess 34 having a circular shape in cross-section is recessed on the vehicle external side surface of the brake rotor 30.

Further, as shown in FIGS. 5 and 6, one positioning through-hole 35, which penetrates through the brake rotor 30 (the second projecting portion 31) in a direction parallel to the rotation center axis CA, is formed in the brake rotor 30. The cross-sectional shape of the positioning through-hole 35 is a circular. The head receiving recess 34 and the positioning through-hole 35 are coaxial with each other and communicate with each other. The diameter of the positioning through-hole 35 is smaller than that of the head receiving recess 34. The head receiving recess 34 and the positioning through-hole 35 are positioned on the base circumference SC on which the position fixing through-holes 33 are positioned. The diameter of the positioning through-hole 35 is larger than that of the positioning threaded hole 29.

Further, as shown in FIGS. 1 and 4, the brake rotor 30 comprises a press contacted portion 37, which is positioned on the outer peripheral side of the second projecting portion 31 and is thinner than the center portion of the brake rotor 30. When a brake pad (not shown) is pressed against the press contacted portion 37, the brake rotor 30 generates a braking force.

As shown in FIG. 4, the first projecting portion 26 of the hub 20 is rotatably fitted into the first rotation support hole 32 of the brake rotor 30.

Therefore, when the hub 20 and the brake rotor 30 are not temporarily fixed (fixed) to each other by a positioning bolt 50 and position fixing bolts 60 all of which are described later, the hub 20 and the brake rotor 30 are relatively rotatable with each other about the rotation center axis CA (the first projecting portion 26 and the first rotation support hole 32).

The tire wheel 40 is made of metal (for example, aluminum). A tire (not shown) is detachably mounted on the outer surface of the tire wheel 40. The tire wheel 40 is positioned on the vehicle external side of the brake rotor 30 as shown in FIGS. 1, 4, 5 and 6.

Figure 2:
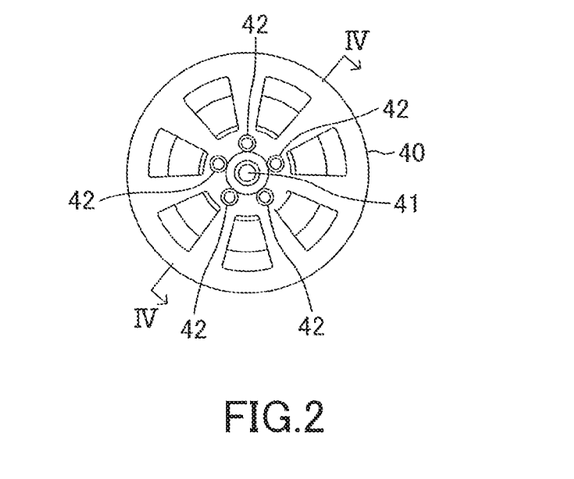
FIG. 2 is a side view of the tire wheel fixed to the brake rotor and the hub as viewed from vehicle external side.

As shown in FIGS. 1, 2 and 4, a second rotation support hole 41 which is coaxial with the rotation center axis CA is formed in the tire wheel 40 as a through hole. The inner diameter of the second rotation support hole 41 is substantially the same as the inner diameter of the first rotation support hole 32 of the brake rotor 30.

As shown in FIGS. 1, 4, 5 and 6, five head receiving recesses 42, which are positioned on the outer peripheral side of the second rotation support hole 41 and have circular shapes, are recessed on the vehicle external side surface of the tire wheel 40.

Furthermore, as shown in FIGS. 5 and 6, five wheel through-holes 43, which are positioned on the outer peripheral side of the second rotation support hole 41 and extend in a direction parallel to the rotation center axis CA, are formed on the vehicle internal side surface of the tire wheel 40. The cross-sectional shape of each of the wheel through-holes 43 is a circular. Each of the head receiving recesses 42 and each of the wheel through-holes 43 are formed on one circumference, which is centered on the rotation center axis CA and has the same diameter as the base circumference SC, at equal angular intervals. The diameter of each of the wheel through-holes 43 is substantially the same as each of the position fixing through-holes 33. Each of the wheel through-holes 43 is coaxial and communicates with the corresponding one of the head receiving recesses 42. The diameter of the wheel through-hole 43 is smaller than that of the head receiving recess 42.

Furthermore, as shown in FIGS. 5 and 6, the head receiving recess 42 side end portion of each of the wheel through-holes 43 is constituted by an annular curved surface 44 which is part of a spherical surface. Each annular curved surface 44 is coaxial with the corresponding one of wheel through-holes 43.

As shown in FIG. 4, the first projecting portion 26 of the hub 20 is rotatably fitted into the second rotation support hole 41 of the tire wheel 40.

Thus, when the tire wheel 40 is not fixed to the hub 20 and the brake rotor 30 by the position fixing bolts 60, the tire wheel 40 is relatively rotatable with respect to the hub 20 and the brake rotor 30 about the rotation center axis CA (the first projecting portion 26 and the second rotation support hole 41).

Thus, the hub 20 and the brake rotor 30 are detachable to/from each other and the tire wheel 40 is detachable to/from the hub 20 and the brake rotor 30.

In order to assemble the hub 20, the brake rotor 30 and the tire wheel 40, before the tire wheel 40 is attached to the brake rotor 30, the hub 20 and the brake rotor 30 are temporarily fixed to each other by one metallic solid positioning bolt 50.

Figure 3:
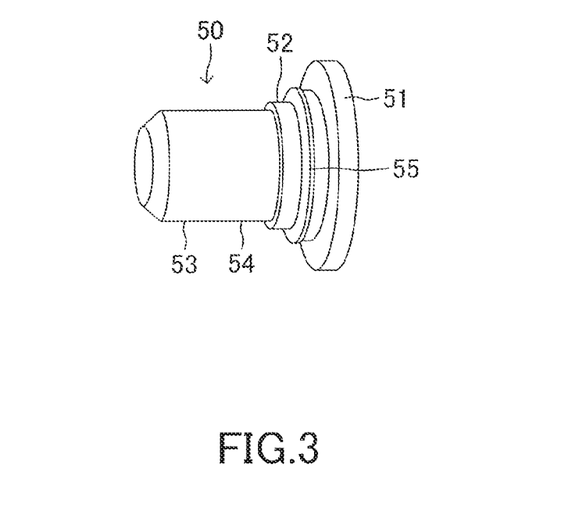
FIG. 3 is a perspective view of the positioning bolt and an O-ring which are integrated with each other.

As shown in FIGS. 3, 5 and 6, the positioning bolt 50 is integrally provided with a first head portion 51, a first large-diameter shaft portion 52 connected to the first head portion 51, and a first small-diameter shaft portion 53 connected to the first large-diameter shaft portion 52. The cross-sectional shape of the first head portion 51, the cross-sectional shape of the first large-diameter shaft portion 52 and the cross-sectional shape of the first small-diameter shaft portion 53 are circular shapes. The diameter of the first large-diameter shaft portion 52 is smaller than that of the first head portion 51, and the diameter of the first small-diameter shaft portion 53 is smaller than that of the first large-diameter shaft portion 52. Furthermore, the outer diameter of the first large-diameter shaft portion 52 is smaller than the inner diameter of the positioning through-hole 35 and is larger than the diameter of the positioning threaded hole 29. Furthermore, a first screw portion 54 is formed on the outer peripheral surface of the first small-diameter shaft portion 53.

The outer diameter of the first small-diameter shaft portion 53 is substantially the same as the inner diameter of the positioning threaded hole 29 and is smaller than the inner diameter of the positioning through-hole 35.

Furthermore, the outer diameter of the first head portion 51 is smaller than the inner diameter of the head receiving recess 34 and is larger than the inner diameter of the positioning through-hole 35. The thickness (wall thickness) of the first head portion 51 is smaller than the depth of the head receiving recess 34.

Further, as shown in FIGS. 3, 5, and 6, an O-ring 55 made of silicone rubber excellent in heat resistance is attached to (mounted on) the outer peripheral surface of the first large-diameter shaft portion 52 of the positioning bolt 50 while elastically deforming. In other words, the O-ring 55, which is elastically expanded from a free state thereof, is mounted on the outer peripheral surface of the first large-diameter shaft portion 52.

The positioning bolt 50 and the O-ring 55 are inserted into the head receiving recess 34 and the positioning through-hole 35 of the brake rotor 30 from the vehicle external side.

The first small-diameter shaft portion 53 of the positioning bolt 50 penetrates through the positioning through-hole 35 of the brake rotor 30, and the first screw portion 54 is screwed into the positioning threaded hole 29 of the hub 20.

However, in order to screw the first screw portion 54 into the positioning threaded hole 29, the screwing operation of the first screw portion 54 to the positioning threaded hole 29 is temporarily stopped at the stage where the distance between the vehicle external side surface of the flange portion 25 and the vehicle internal side surface of the first head portion 51 is larger than the dimension of the positioning through-hole 35 in the axial direction. That is, the first screw portion 54 of the positioning bolt 50 is temporarily tighten in the positioning threaded hole 29. At this time, the first large-diameter shaft portion 52 of the positioning bolt 50 and the O-ring 55 are located in the positioning through-hole 35 to bring the outer periphery of the O-ring 55 into contact with the inner peripheral surface of the positioning through-hole 35.

When the first screw portion 54 is temporarily tightened in the positioning threaded hole 29, a clearance is formed between the inner peripheral surface of the positioning through-hole 35 and the outer peripheral surface of the first large-diameter shaft portion 52. Hereinafter, this clearance is referred to as a first clearance CL1.

For example, as shown in FIG. 5, when the positioning bolt 50 and the positioning through-hole 35 of the brake rotor 30 are substantially coaxial with each other, two clearances CL1-*a*, CL1-*b* are formed between the first large-diameter shaft portion 52 and the positioning through-hole 35. Therefore, the first clearance CL1 is formed by the two clearances CL1-*a* and CL1-*b*.

FIG. 5 shows virtual cutting sections of the hub 20, the brake rotor 30 and the tire wheel 40 along the base circumference SC (and the circumference on which each of the position fixing threaded holes 28 is positioned and the circumference on which each of the wheel through-holes 43 is positioned). Therefore, the total value of the dimensions (widths) of the clearances CL1-*a* and CL1-*b* in FIG. 5 represents the total value L1 of the dimension (width) of the first clearance CL1 (i.e., the entire length of the first clearance CL1) in the base circumference SC direction.

With the first screw portion 54 of the positioning bolt 50 temporally tightened in the positioning threaded hole 29, a worker finely adjusts the relative rotational position of the brake rotor 30 with respect to the hub 20 in the base circumference SC direction by using the first clearance CL1 to make each of the position fixing threaded holes 28 and the corresponding one of the position fixing through-holes 33 substantially coaxial with each other as shown in FIG. 5. That is, each of the position fixing threaded holes 28 is made to be positioned on the inner peripheral side of the corresponding one of the position fixing through-holes 33 when viewed in the rotation center axis CA direction.

However, the O-ring 55 is in contact with the inner peripheral surface of the positioning through-hole 35 while elastically deforming. In other words, the whole O-ring 55 is elastically deformed substantially uniformly and the entire outer peripheral portion thereof is in contact with the inner peripheral surface of the positioning through-hole 35.

Therefore, when the O-ring 55 generates sufficiently large elastic biasing force, even if the worker does not finely adjust the position of the brake rotor 30, the dimension of the clearance CL1-*a* in the base circumference SC direction in the positioning through-hole 35 and the dimension of the clearance CL1-*b* in the base circumference SC direction in the positioning through-hole 35 are substantially equal to each other.

Therefore, in this case, even if the worker does not finely adjust the position of the brake rotor 30, each of the position fixing threaded holes 28 is positioned on the inner peripheral side of the corresponding one of the position fixing through-holes 33 when viewed in the rotation center axis CA direction by the elastic biasing force generated by the O-ring 55.

Next, with the vehicle internal side surface of the brake rotor 30 in contact with the vehicle external side surface of the flange portion 25, the first screw portion 54 is screwed into the positioning threaded hole 29 so that the first head portion 51 of the positioning bolt 50 is brought into contact with the vehicle external side surface of the brake rotor 30 (bottom of the head receiving recess 34). Then, the hub 20 and the brake rotor 30 are temporarily fixed to each other by the positioning bolt 50.

Subsequently, as shown in FIG. 4, the vehicle internal side surface of the tire wheel 40 is brought into contact with the vehicle external side surface of the second projecting portion 31 of the brake rotor 30 which is temporarily fixed to the hub 20, and the second rotation support hole 41 of the tire wheel 40 is rotatably fitted into the first projecting portion 26 of the hub 20. The tire wheel 40 is fixed to the hub 20 and the brake rotor 30 using the five position fixing bolts 60.

The solid position fixing bolt 60 made of the same metal as the positioning bolt 50 is integrally provided with a second head portion 61, a second small-diameter shaft portion 63 and a second large-diameter shaft portion 64.

The second head portion 61 is integrally provided with a distal end portion 61*a* and a press contact portion 61*b*.

The cross-sectional shape of the distal end portion 61*a* is a hexagon.

The outer peripheral surface of the press contact portion 61*b* is constituted by an annular curved surface 62 which is part of a spherical surface having substantially the same curvature as the annular curved surface 44. That is, the cross-sectional shape of the press contact portion 61*b* is a circular. The outer diameter of the largest diameter portion of the annular curved surface 62 is larger than the outer diameter of the largest diameter portion of the annular curved surface 44.

The cross-sectional shape of the second small-diameter shaft portion 63 connected to the press contact portion 61*b* and the cross-sectional shape of the second large-diameter shaft portion 64 connected to the second small-diameter shaft portion 63 are circulars. Furthermore, a second screw portion 65 is formed on the outer peripheral surface of the second large-diameter shaft portion 64.

The diameter of the second small-diameter shaft portion 63 is smaller than those of the press contact portion 61*b* and the second large-diameter shaft portion 64.

The outer diameter of the second large-diameter shaft portion 64 (the second screw portion 65) is substantially the same as the inner diameter of the position fixing threaded holes 28.

Furthermore, the outer diameter of the second large-diameter shaft portion 64 is smaller than the inner diameter of each position fixing through-hole 33 and the inner diameter of each wheel through-hole 43.

The difference between the outer diameter of the first large-diameter shaft portion 52 and the inner diameter of the positioning through-hole 35 is larger than the difference between the outer diameter of the second large-diameter shaft portion 64 and the inner diameter of the position fixing through-hole 33.

As shown in FIG. 5, each of the position fixing bolts 60 is inserted into each of the head receiving recesses 42 and each of the wheel through-holes 43 of the tire wheel 40, each of the position fixing through-holes 33 of the brake rotor 30, and each of the position fixing threaded holes 28 of the hub 20 from the vehicle external side.

The second large-diameter shaft portion 64 of each of the position fixing bolts 60 penetrates through the corresponding one of the wheel through-holes 43 of the tire wheel 40 and the corresponding one of the position fixing through-holes 33 of the brake rotor 30, and each second screw portion 65 is screwed into the corresponding one of the position fixing threaded holes 28 of the hub 20. Then, the annular curved surface 62 of the press contact portion 61*b* of each of the position fixing bolts 60 is pressed against the corresponding one of the annular curved surfaces 44 of the tire wheel 40, and the brake rotor 30 (the second projecting portion 31) is sandwiched between the hub 20 (the flange portion 25) and the tire wheel 40. That is, the tire wheel 40 is fixed to the hub 20 and the brake rotor 30 by the five position fixing bolts 60.

When the second large-diameter shaft portion 64 of each of the position fixing bolts 60 is inserted into the corresponding one of the position fixing through-holes 33, a clearance is formed between the inner peripheral surface of each position fixing through-hole 33 and the outer peripheral surface of each second large-diameter shaft portion 64. Hereinafter, each of these clearances is referred to as a second clearance CL2.

For example, as shown in FIG. 5, when the second large-diameter shaft portion 64 of each position fixing bolt 60 and each position fixing through-hole 33 of the brake rotor 30 are substantially coaxial with each other, two clearances CL2-*a* and CL2-*b* are formed between each second large-diameter shaft portion 64 and each position fixing through-hole 33. Therefore, a second clearance CL2 is formed by the two clearances CL2-*a* and CL2-*b* in each position fixing through-hole 33.

As mentioned above, FIG. 5 shows virtual cutting sections of the hub 20, the brake rotor 30 and the tire wheel 40 along the base circumference SC. Therefore, the total value of the dimensions (widths) of the clearances CL2-*a* and CL2-*b* in FIG. 5 represents the total value L2 of the dimension (width) of the second clearance CL2 (i.e., the entire length of the second clearance CL2) in the base circumference SC direction.

In the present embodiment, the cross-sectional shapes of each position fixing through-hole 33 and the positioning through-hole 35 of the brake rotor 30, the cross-sectional shape of the first large-diameter shaft portion 52 of the positioning bolt 50, and the cross-sectional shape of the second large-diameter shaft portion 64 of each position fixing bolt 60 are designed so that the total value L1 of the dimension of the first clearance CL1 in the base circumference SC direction is larger than the total value L2 of the dimension of the second clearance CL2 in the base circumference SC direction.

By the way, the outer diameter of the second large-diameter shaft portion 64 (the second screw portion 65) of each position fixing bolt 60 is larger than the outer diameter of the first large-diameter shaft portion 52 (and the first small-diameter shaft portion 53) of the positioning bolt 50. The material of the positioning bolt 50 and the material of each position fixing bolt 60 are the same as each other.

Therefore, the mechanical strength of the second large-diameter shaft portion 64 of each the position fixing bolt 60 is larger than the mechanical strength of the first large-diameter shaft portion 52 (and the first small-diameter shaft portion 53) of the positioning bolt 50.

When the vehicle, which has the wheel 10 equipped with the hub 20, the brake rotor 30 and the tire wheel 40, travels on a road while rotating the tire mounted on the outer peripheral surface of the tire wheel 40, a vibration is transmitted from the road surface to the tire wheel 40, the brake rotor 30 and the hub 20 via the tire.

Therefore, when a value of accumulated travelling distance of this vehicle becomes large, the axial force of the position fixing bolts 60 may decrease. Then, as shown in FIG. 6, due to the rotational force received from the tire, the brake rotor 30 rotates with respect to the hub 20 in the base circumference SC direction about the rotation center axis CA (in the example of FIG. 6, the brake rotor 30 moves with respect to the hub 20 downward in FIG. 6).

However, since the O-ring 55 is installed in the first clearance CL1, the inner peripheral surface of the positioning through-hole 35 does not collide with the first large-diameter shaft portion 52 of the positioning bolt 50 when the brake rotor 30 rotates with respect to the hub 20 due to the reduction of the axial force of each position fixing bolt 60. On the other hand, as shown in FIG. 6, when the brake rotor 30 rotates with respect to the hub 20, the inner peripheral surface of each position fixing through-hole 33 collides with the outer peripheral surface of the second large-diameter shaft portion 64 of each position fixing bolt 60. That is, the rotation force of the brake rotor 30 is received by the second large-diameter shaft portion 64 of each position fixing bolt 60, which has the mechanical strength higher than the first large-diameter shaft portion 52, instead of the first large-diameter shaft portion 52 of the positioning bolt 50.

Moreover, the number of the position fixing through-hole 33 of the brake rotor 30 and the number of the position fixing bolt 60 are not one but five. That is, each of the five position fixing bolts 60 (the second large-diameter shaft portions 64) receives part of the rotational force of the brake rotor 30.

Therefore, when the brake rotor 30 rotates with respect to the hub 20, the risk of the position fixing bolts 60 getting damage is small.

Although the positioning through-hole 35 moves with respect to the first large-diameter shaft portion 52 of the positioning bolt 50 when the brake rotor 30 rotates with respect to the hub 20, most of the moving force of the positioning through-hole 35 is absorbed by the O-ring 55. Therefore, most of the moving force of the positioning through-hole 35 is not transmitted to the first large-diameter shaft portion 52 of the positioning bolt 50.

Therefore, when the brake rotor 30 rotates with respect to the hub 20, the risk of the positioning bolt 50 getting damage is small.

Further, although the total value L1 of the dimension of the first clearance CL1 in the base circumference SC direction is larger than the total value L2 of the dimension of the second clearance CL2 in the base circumference SC direction, it is easy to finely adjust (finely tune) the relative rotational position of the brake rotor 30 with respect to the hub 20 by using the elasticity of the O-ring 55 and the first clearance CL1 when the positioning bolt 50 is temporary tightened. That is, it is easy to finely adjust the relative rotational position of the brake rotor 30 with respect to the hub 20 so that each position fixing threaded hole 28 is positioned on the inner peripheral side of the corresponding one of the position fixing through-holes 33 when viewed in the rotation center axis CA direction.

Therefore, it is easy to temporarily fix the hub 20 and the brake rotor 30 by the positioning bolt 50 so that each position fixing threaded hole 28 is positioned on the inner peripheral side of the corresponding one of the position fixing through-holes 33.

The O-ring 55 can be manufactured at low cost.

Therefore, it is possible to reduce the manufacturing cost of the wheel 10.

It should be noted that the present invention is not limited to the above embodiment, and various modifications can be adopted within the scope of the present invention.

Figure 7:
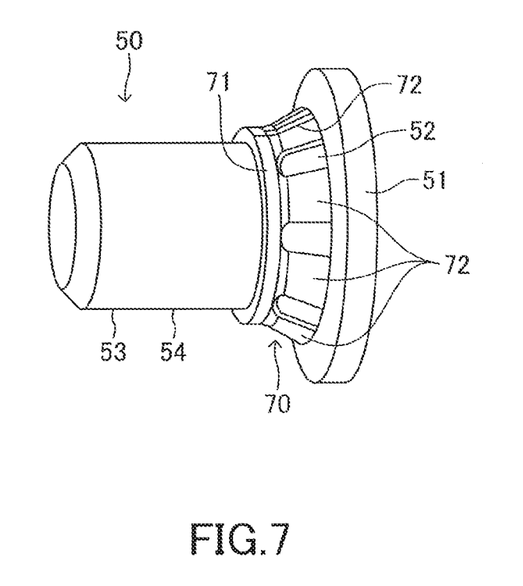
FIG. 7 is a perspective view of the positioning bolt and an annular spring member of a modified embodiment of the present invention, which are integrated with each other.
Figure 8:
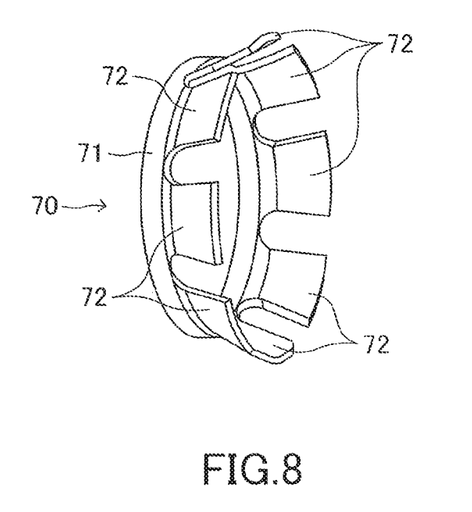
FIG. 8 is a perspective view of the annular spring member of the modified embodiment.
Figure 9:
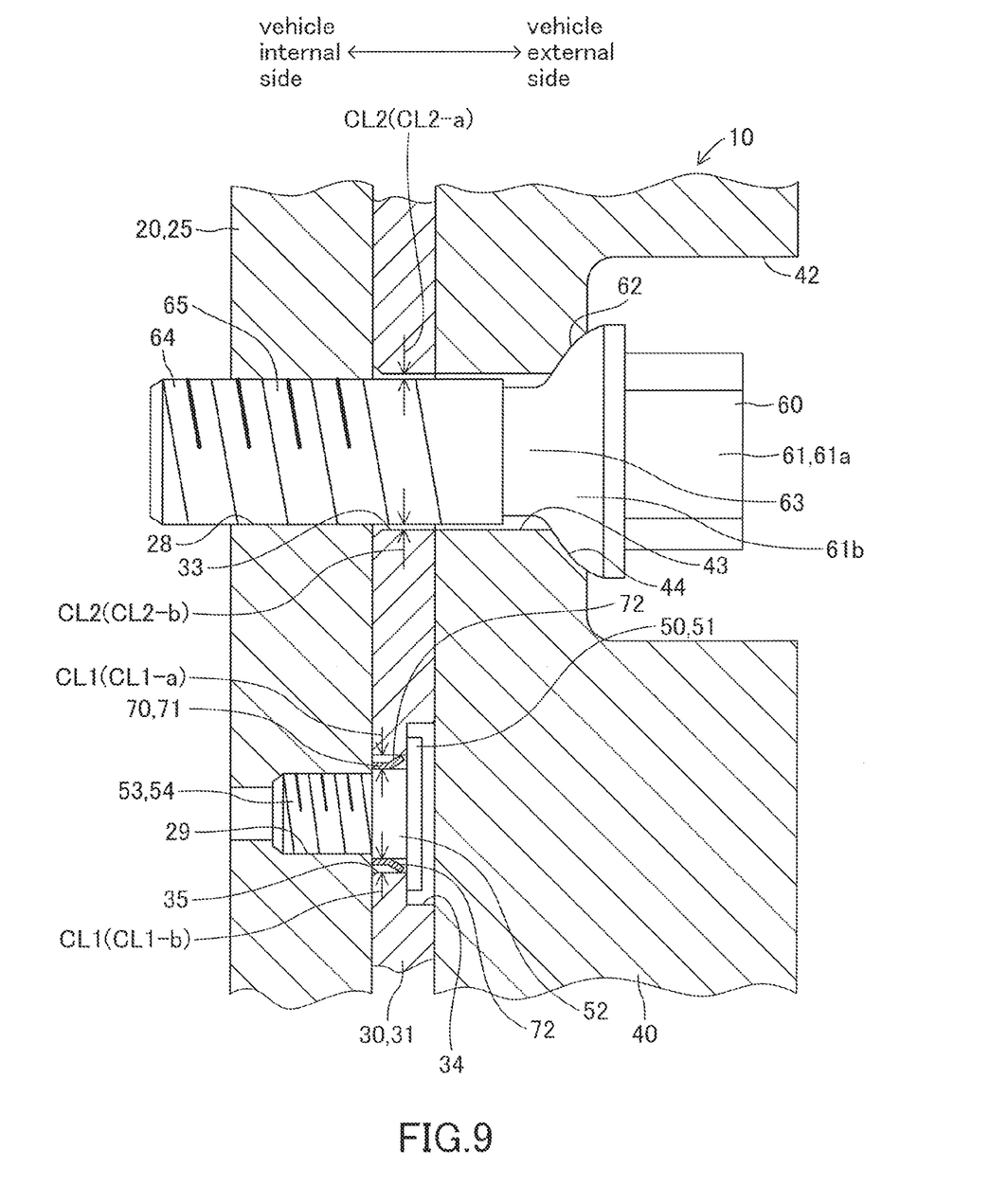
FIG. 9 is a cross-sectional view of the modified embodiment similar to FIG. 5.

For example, the present invention can be carried out in a manner of a modified embodiment of FIGS. 7 to 9.

In this modified embodiment, an annular spring member 70 made of an elastic metal (for example spring steel) is used instead of the O-ring 55.

As shown in FIGS. 7 and 8, this annular spring member 70 is integrally provided with a base portion 71 having an annular shape and a plurality of elastic deformation portions 72 protruding from the base portion 71. The elastic deformation portions 72 are arranged at equal angular intervals in the circumferential direction of the base portion 71.

When the annular spring member 70 is in a free state, the inner diameter of the base portion 71 is slightly larger than the outer diameter of the first large-diameter shaft portion 52 of the positioning bolt 50. Further, when the annular spring member 70 is in the free state, the free end of each elastic deformation portion 72 is positioned on the outer peripheral side of the annular spring member 70 with respect to the base end of each elastic deformation portion 72. Furthermore, at this time, the diameter of a circle passing through the free end of each elastic deformation portion 72 is larger than the inner diameter of the positioning through-hole 35.

This annular spring member 70 can be manufactured by, for example, press molding using a metal plate.

Before the positioning bolt 50 is inserted into the positioning through-hole 35 and the positioning threaded hole 29, the base portion 71 of the annular spring member 70 is attached to the first large-diameter shaft portion 52 of the positioning bolt 50. Then, part of the inner peripheral surface of the base portion 71 comes into contact with the first large-diameter shaft portion 52. Further, at this time, a facing surface of each elastic deformation portion 72 of the annular spring member 70 faces the first large-diameter shaft portion 52 and is separated from the first large-diameter shaft portion 52 to the outer peripheral side of the first large-diameter shaft portion 52.

The positioning bolt 50 and the annular spring member 70, which has been integrated with each other in this way, are inserted into each head receiving recess 34 and each positioning through-hole 35 of the brake rotor 30 from the vehicle external side. Then, the first screw portion 54 is temporarily tightened in the positioning threaded hole 29.

Then, as shown in FIG. 9, each elastic deformation portion 72 of the annular spring member 70 is positioned in the positioning through-hole 35 and each elastic deformation portion 72 comes into contact with the inner peripheral surface of the positioning through-hole 35 while elastically deforming to the inner peripheral side. Therefore, the annular spring member 70 attached to the positioning bolt 50 performs substantially the same function as the O-ring 55 of the above embodiment.

Therefore, also in this modified embodiment, a first clearance CL1 is formed between the inner peripheral surface of the positioning through-hole 35 of the brake rotor 30 and the outer peripheral surface of the first large-diameter shaft portion 52 of the positioning bolt 50.

Therefore, when the hub 20 and the brake rotor 30 is temporarily fixed to each other by the positioning bolt 50 and the tire wheel 40 is fixed to the hub 20 and the brake rotor 30 by the position fixing bolts 60 after that, the assembling of the wheel 10 is completed.

Since the annular spring member 70 performs substantially the same function as the O-ring 55 in the above embodiment, the wheel 10 of this modified embodiment can perform the same action and effect as the wheel 10 having the O-ring 55 in the above embodiment.

The annular spring member 70 can be manufactured at low cost.

Therefore, also in this modified embodiment, it is possible to reduce the manufacturing cost of the wheel 10.

Furthermore, a shock absorber, which has a structure different from the O-ring 55 and the annular spring member 70 and has elasticity, may be installed in the first clearance CL1.

The positioning bolt 50 and the shock absorber may be inserted independently (separately) into the positioning through-hole 35.

In the embodiment and the modified embodiment, a plurality of the positioning threaded holes 29 may be provided in the hub 20 and a plurality of the positioning through-holes 35 and the head receiving recesses 34 may be provided in the brake rotor 30.

In this case, each of a plurality of the positioning bolts 50 is inserted into the corresponding one of the head receiving recesses 34 and the corresponding one of the positioning through-holes 35, and the first screw portion 54 of each positioning bolt 50 is inserted into the corresponding one of the positioning threaded holes 29.

Each of the position fixing through-holes 33 may be formed in the brake rotor 30 so that at least one position fixing through-hole 33 is separated from the base circumference SC. In this case, each of position fixing threaded holes 28 is formed in the hub 20 so that each of position fixing threaded holes 28 faces the corresponding one the position fixing through-holes 33.

A portion, which corresponds to the first large-diameter shaft portion 52 and has a diameter smaller than each position fixing through-hole 33, may be formed in each position fixing bolt 60. Then, this portion corresponding to the first large-diameter shaft portion 52 may be positioned in the corresponding one of the position fixing through-holes 33 to form a second clearance CL2 between the outer peripheral surface of this portion of each position fixing bolt 60 and the inner peripheral surface of each position fixing through-hole 33.

At least one of cross-sectional shape of each position fixing through-hole 33, cross-sectional shape of the positioning through-hole 35, cross-sectional shape of the first large-diameter shaft portion 52 and cross-sectional shape of the portion, which is part of the position fixing bolt 60 and corresponds to the first large-diameter shaft portion 52, may be a non-circular shape.

Figure 10:
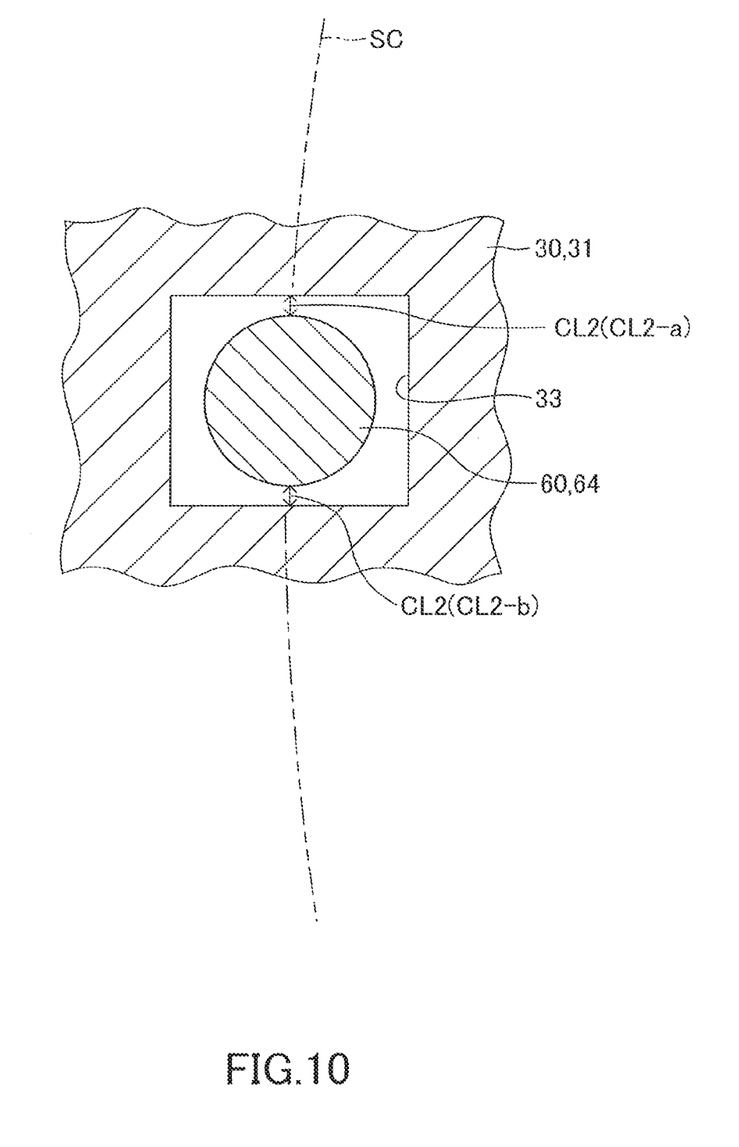
FIG. 10 is a cross-sectional view of the position fixing through-hole and a second large diameter shaft portion of the position fixing bolt of another modified embodiment.

For example, as shown in FIG. 10, cross-sectional shape of each position fixing through-hole 33 may be a square. In this case, when the second large-diameter shaft portion 64 of the position fixing bolt 60 and the position fixing through-hole 33 of the brake rotor 30 are substantially coaxial with each other, two clearances CL2-$a$, CL2-$b$ are formed between the second large-diameter shaft portion 64 and the position fixing through-hole 33. Therefore, the second clearance CL2 is formed by the two clearances CL2-$a$ and CL2-$b$.

The total value of the dimensions (widths) of the clearances CL2-$a$ and CL2-$b$ in FIG. 10 represents the total value L2 of the dimension (width) of the second clearance CL2 (i.e., the entire length of the second clearance CL2) in the base circumference SC direction.

What is claimed is:

1. An assembled structure for tire wheel, brake rotor, and hub comprising:
   a hub including at least one positioning threaded hole and a plurality of position fixing threaded holes, said hub supported by a vehicle body so as to be rotatable about a predetermined rotation center axis;
   a brake rotor that faces said hub from one side of said rotation center axis and is rotatable with respect to said hub about said rotation center axis, said brake rotor including at least one positioning through-hole and a plurality of position fixing through-holes;
   a tire wheel facing said brake rotor from said one side and being rotatable with respect to said brake rotor about said rotation center axis, said tire wheel including a plurality of wheel through-holes;
   at least one positioning bolt including a first head portion that contacts with a surface of said brake rotor from said one side and a first shaft portion that passes through at least one said positioning through-hole from said one side to the other side of said rotation center axis and has a first screw portion screwed into at least one said positioning threaded hole;
   a plurality of position fixing bolts each of which includes a second head portion contacting with a surface of said tire wheel from said one side and a second shaft portion passing through each of said wheel through-holes and each of said position fixing through-holes from said one side to said other side, said second shaft portion having a second screw portion that fixes said tire wheel to said hub and said brake rotor by being screwed into each of said position fixing threaded holes; and
   at least one shock absorber that is installed in a first clearance formed between an inner peripheral surface of said positioning through-hole and an outer peripheral surface of said first shaft portion of said positioning bolt, said shock absorber contacting with said inner peripheral surface and said outer peripheral surface while elastically deforming, wherein, mechanical strength of said second shaft portion of said position fixing bolt is larger than that of said first shaft portion of said positioning bolt, cross-sectional shape of said positioning through-hole, cross-sectional shape of said first shaft portion, cross-sectional shape of each of said position fixing through-holes, and cross-sectional shape of each of said second shaft portions are designed so that a total dimension of said first clearance in a circumferential direction about said rotation center axis is larger than a total dimension of a second clearance in said circumferential direction, said second clearance formed between an inner peripheral surface of each of said position fixing through-holes and an outer peripheral surface of said second shaft portion of each of said position fixing bolts.

2. The assembled structure for tire wheel, brake rotor, and hub according to claim 1, wherein, cross-sectional shapes of said positioning through-hole, said first shaft portion, said position fixing through-hole, and said second shaft portion are circular shapes, a difference between an inner diameter of said positioning through-hole and an outer diameter of said first shaft portion is larger than an inner diameter of said position fixing through-hole and an outer diameter of said second shaft portion.

3. The assembled structure for tire wheel, brake rotor, and hub according to claim 1, wherein, said shock absorber is an O-ring made of rubber.

4. The assembled structure for tire wheel, brake rotor, and hub according to claim 1, wherein, said shock absorber is a metal annular member which can elastically deform in a radial direction thereof.

\* \* \* \* \*